US008619665B2

(12) United States Patent
Hedberg et al.

(10) Patent No.: US 8,619,665 B2
(45) Date of Patent: Dec. 31, 2013

(54) DERIVATION OF USER EQUIPMENT IDENTIFIERS

(75) Inventors: Anne-Lott Hedberg, Lund (SE); Christian Herrero Verón, Lund (SE); Regina Johannesson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 825 days.

(21) Appl. No.: 11/963,802

(22) Filed: Dec. 22, 2007

(65) Prior Publication Data

US 2008/0186903 A1    Aug. 7, 2008

Related U.S. Application Data

(60) Provisional application No. 60/887,891, filed on Feb. 2, 2007.

(51) Int. Cl.
*H04L 12/56*     (2011.01)
*H04W 80/04*     (2009.01)
*H04W 8/26*      (2009.01)

(52) U.S. Cl.
USPC ............ 370/319; 370/349; 370/389; 370/474

(58) Field of Classification Search
USPC ....................................................... 370/319
See application file for complete search history.

(56) References Cited

U.S. PATENT DOCUMENTS

| | | | | |
|---|---|---|---|---|
| 5,056,119 A | * | 10/1991 | Sakalian et al. | 370/512 |
| 6,065,673 A | * | 5/2000 | Kokkila | 455/408 |
| 6,122,525 A | * | 9/2000 | Krolopp et al. | 455/411 |
| 6,708,033 B1 | * | 3/2004 | Linkola et al. | 455/440 |
| 6,714,799 B1 | * | 3/2004 | Park et al. | 370/335 |
| 6,871,069 B1 | * | 3/2005 | Cho | 455/433 |

(Continued)

FOREIGN PATENT DOCUMENTS

| | | |
|---|---|---|
| EP | 1496716 A1 | 1/2005 |
| WO | 2006/005999 A | 1/2006 |
| WO | 2006/021146 A | 3/2006 |
| WO | 2006/048051 A1 | 5/2006 |

OTHER PUBLICATIONS

International Telecommunication Union Recommendation E.212. Series E: Overall Network Operation, Telephone Service, Service Operation and Human Factors: Operation, numbering, routing and mobile services—International operation—Maritime mobile service and public land mobile service. The international identification plan for mobile terminals and mobile users, Nov. 1998.

(Continued)

*Primary Examiner* — Ian N Moore
*Assistant Examiner* — Jenee Alexander
(74) *Attorney, Agent, or Firm* — Potomac Patent Group PLLC

(57) ABSTRACT

Solutions are described that enable a user equipment (UE) for a communication system always to derive required identifiers using an international mobile subscriber identity (IMSI) even when the UE has only a subscriber identity module. One solution is based on a table, or list, that is maintained in the UE. Another solution is based on always taking a predetermined number of digits of the IMSI. Yet another solution is based on try-and-fail signaling. In consequence, the UE does not always need to know how many digits of the IMSI are used to indicate a mobile network code, which in some situations is impossible to know anyway.

12 Claims, 3 Drawing Sheets

(56) References Cited

U.S. PATENT DOCUMENTS

| | | | |
|---|---|---|---|
| 7,079,834 B2* | 7/2006 | Kyung et al. | 455/410 |
| 7,447,502 B2* | 11/2008 | Buckley et al. | 370/331 |
| 7,573,861 B2* | 8/2009 | Kyung et al. | 370/349 |
| 2001/0016495 A1* | 8/2001 | Chandnani et al. | 455/445 |
| 2003/0009680 A1* | 1/2003 | Kiiveri | 713/189 |
| 2004/0104841 A1* | 6/2004 | Syrjarinne | 455/445 |
| 2004/0152462 A1* | 8/2004 | Hwang | 455/432.1 |
| 2004/0242222 A1* | 12/2004 | An et al. | 455/423 |
| 2005/0009504 A1* | 1/2005 | Kyung et al. | 455/411 |
| 2005/0025115 A1* | 2/2005 | Kyung et al. | 370/349 |
| 2005/0113088 A1* | 5/2005 | Zinn et al. | 455/435.2 |
| 2005/0193150 A1* | 9/2005 | Buckley et al. | 709/227 |
| 2006/0128400 A1* | 6/2006 | Liang et al. | 455/458 |
| 2006/0128433 A1* | 6/2006 | Liang et al. | 370/342 |
| 2006/0178167 A1* | 8/2006 | Tamura et al. | 455/560 |
| 2006/0198351 A1* | 9/2006 | Baek | 370/338 |
| 2006/0212700 A1* | 9/2006 | Zhang | 713/167 |
| 2006/0246899 A1* | 11/2006 | Buckley et al. | 455/435.2 |
| 2007/0104196 A1* | 5/2007 | An et al. | 370/390 |
| 2007/0232354 A1* | 10/2007 | Moscovitz et al. | 455/557 |
| 2009/0129371 A1* | 5/2009 | Bishay | 370/352 |

OTHER PUBLICATIONS

International Telecommunication Union Telecommunication Standardization Bureau of ITU: Mobile Network Code (MNC) for the international identification plan for mobile terminals and mobile users (According to ITU-T Recommendation E.212 (May 2004)—Position on Nov. 1, 2006, Geneva.

3GPP Technical Specification TS 24.234 V6.7.0, 3GPP System to Wireless Local Area Network (WLAN) interworking; WLAN User Equipment (WLAN UE) to network protocols; Stage 3 (Release 6), Sep. 2006.

3GPP Technical Specification TS 44.318 V6.10.0, Generic Access (GA) to the A/Gb interface; Mobile GA interface layer 3 specification (Release 6), Sep. 2007.

3GPP Technical Specification TS 23.003 V6.14.0, Numbering, Addressing, and Identification (Release 6), Sep. 2007.

3GPP Technical Specification TS 31.102 V7.7.0, Characteristics of the Universal Subscriber Identity Module (USIM) application (Release 7), Nov. 2006.

3GPP TS 23.122 V6.5.0, Non-Access-Stratum Functions Related to Mobile Station (MS) in idle Mode (Release 6), Jun. 2005.

Open Mobile Alliance Device Management Requirements, Candidate Version 1.2, Apr. 24, 2006, OMA-RD-DM_V1_2-20060424-C.

ETSI TS 123 003.

3GPP TS 31.102 V6.19.0.

3GPP 23.003 V6.11.0.

PCT Partial International Search Report, mailed Jul. 2, 2008, in connection with International Application No. PCT/EP2008/050934.

European Search Report, mailed Oct. 1, 2008, in connection with International Application No. PCT/EP2008/050934.

* cited by examiner

DERIVATION OF USER EQUIPMENT IDENTIFIERS

This application claims the benefit of the filing date of U.S. Provisional Patent Application No. 60/887,891 filed on Feb. 2, 2007, which is incorporated here by reference.

BACKGROUND

This invention relates to electronic communication systems and more particularly to packet-data communication systems.

Electronic communication systems include time-division multiple access (TDMA) systems, such as cellular radio telephone systems that comply with the GSM telecommunication standard and its enhancements, such as General Packet Radio Service (GPRS) and Enhanced Data Rates for GSM Evolution (EDGE), and code-division multiple access (CDMA) systems, such as cellular radio telephone systems that comply with the IS-95, cdma2000, and wideband CDMA (WCDMA) telecommunication standards. Electronic communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates specifications for UMTS, WCDMA, and GSM communication systems.

FIG. 1 depicts a cellular radio telephone system 10. A base station controller (BSC) 12 and a radio network controller (RNC) 14 control various radio network functions, including for example radio access bearer setup, diversity handover, etc. More generally, the BSC and RNC direct connections to/from mobile stations (MSs) 16 and user equipments (UEs) 18, which may be mobile telephones or other remote terminals, via the appropriate base transceiver station(s) (BTSs) and Node Bs, which communicate with each MS and UE through downlink (i.e., BTS/Node B to MS/UE) and uplink (i.e., MS/UE to BTS/Node B) channels. BSC 12 is shown coupled to BTSs 20, 22, and RNC 14 is shown coupled to Node Bs 24, 26. Each BTS/Node B serves a geographical area that can be divided into one or more cell(s). The BTSs/Node Bs are coupled to their corresponding BSC/RNC by dedicated telephone lines, optical fiber links, microwave links, etc. A BSC and its connected BTSs generally comprise a base station system (BSS), as indicated by the dashed lines in FIG. 1.

The BSC 12 and RNC 14 are connected to external networks such as the public switched telephone network (PSTN), the Internet, etc. through one or more nodes in a core network 28. As depicted in FIG. 1, the core network 28 includes a mobile switching center (MSC) 30, and packet radio service nodes, such as serving GPRS support nodes (SGSNs) 32, 34, and a gateway GPRS support node 36. Also shown in FIG. 1 is a domain name system (DNS) server 38 that is provided for internet protocol (IP) address resolution.

It will be appreciated of course that various names can be used for the devices depicted in FIG. 1, and for simplicity, the terminals 16, 18 will be commonly called UEs in this application. In general, the signal and data interface between a BSS and an MSC, which may have a co-located visitor location register (VLR), is called the "A interface", and signal and data interface between a BSS and an SGSN is called the "Gb interface". It will be recognized that the A interface connects the BSS to circuit-switched core network nodes and that the Gb interface connects the BSS to packet-switched core network nodes.

Today, the 3GPP standard requires a UE to derive various identifiers and other parameters from the International Mobile Subscriber Identity (IMSI), which is unique to the UE. For example, generic access to the A/Gb interfaces (GAN) and interworking wireless local area network (I-WLAN) use such identifiers and parameters. In particular, Sections 14.2, 17.2, and 17.3 of 3GPP Technical Specification (TS) 23.003 V6.14.0, Numbering, Addressing, and Identification (Release 6) (September 2007), specifies that a WLAN UE or an MS with WLAN capabilities derives from the IMSI such parameters as the home network realm for I-WLAN, the home network domain name for GAN, the provisioning GANC-SEGW identifier, and the provisioning GANC identifier. "GANC" is short for generic access network controller, and "SEGW" is short for security gateway.

The identifiers and parameters are derived by a procedure that involves examining an IMSI and identifying the digits of the Mobile Country Code (MCC) and Mobile Network Code (MNC) in order to determine the network to which the IMSI belongs. As explained in Section 2.2 of 3GPP TS 23.003 and as depicted in FIG. 2, an IMSI is not more than fifteen digits and has three parts: a 3-digit MCC that identifies uniquely the country of domicile of the mobile subscriber; a 2- or 3-digit MNC that identifies the home public land mobile network (HPLMN) of the mobile subscriber; and a mobile subscriber identification number (MSIN) that identifies the mobile subscriber within a PLMN. The MNC and MSIN constitute a national mobile subscriber identity (NMSI). As depicted in FIG. 2, the first three digits of an IMSI are always the MCC, and either the next two or the next three digits are the MNC.

Under ITU-T Recommendation E.212, The International Identification Plan for Mobile Terminals and Mobile Users, an MNC is allowed to be up to three digits, but the original GSM standard specified two-digit MNCs. Currently, some countries and regions (i.e., MCCs) use a combination of 2-digit MNCs and 3-digit MNCs. In the past, only the United States and a few other countries have used 3-digit MNCs, but that situation has changed as many other countries have decided to use 3-digit MNCs. Furthermore, looking at the 1 Nov. 2006 version of the ITU-T Recommendation E.212, the trend seems to favor 3-digit MNCs for new countries and networks.

The derivation procedure specified in 3GPP TS 23.003 for the I-WLAN and GAN identifiers uses the fact that the UE knows whether a 2- or 3-digit MNC is used in its IMSI. This is implied by the reference to 3GPP TS 31.102, Characteristics of the Universal Subscriber Identity Module (USIM) Application, in Sections 14.2; 17.2.1; and 17.3.1 of TS 23.003. According to those sections of TS 23.003, one simply takes an IMSI's first five or six digits, depending on whether a 2- or 3-digit MNC is used, and separates those digits into an MCC and an MNC. If the MNC is two digits, then a zero is added at the beginning to make it three digits.

Nevertheless, a UE does not always know whether a 2- or 3-digit MNC is used in its IMSI. The reference to TS 31.102 in the procedure specified by TS 23.003 is appropriate for UEs having universal subscriber identity modules (USIMs), but not for UEs having subscriber identity modules (SIMs). A SIM may not have information on whether a 2- or 3-digit MNC is used in the IMSI, and yet UEs having SIMs can be used for both I-WLAN and GAN. Indicating whether a 2- or 3-digit MNC is used is only an option for SIMs compliant with versions of the 3GPP specifications that are Release 99 or later.

Because such MNC information is just an option, and one that was introduced relatively recently, the fact is that many SIM implementations currently on the market do not provide this information. Many users still have the SIM that they received with their first mobile network subscriptions, and many users do not change SIMs when they get new mobile phones. Even if a user does change SIM, the new SIM provided may still not provide the necessary information, because it is just optional. Furthermore, it is important to remember that during at least the first few years of operation of both I-WLAN and GAN deployments, it can be expected that the number of SIMs would be larger than the number of USIMs.

By applying HPLMN matching criteria as described in Annex A of 3GPP TS 23.122 V6.5.0, Non-Access-Stratum Functions Related to Mobile Station (MS) in Idle Mode (Release 6) (June 2005), a UE having a SIM can determine whether a 2- or 3-digit MNC is used in its IMSI if the PLMN indicates the MCC and MNC in its broadcast channel messages. The UE first compares the MCC stored in its SIM with the broadcast MCC and determines whether they match (which indicates that the UE is under home country coverage). If so, the UE reads the third digit of the broadcast MNC. If the third digit has the hexadecimal value F, then the MNC used by the PLMN is a 2-digit MNC. Finally, the UE compares just the first two digits or three digits of the MNC stored in its SIM with the broadcast MNC. If the values match, then the HPLMN match succeeds; otherwise, the HPLMN match fails. In this way, the UE learns whether a 2- or 3-digit MNC is used in its IMSI.

European Patent Application Publication EP 1 496 716 A1 states that it describes a method of communicating a variable length MNC from a network to a mobile station. The method includes transmitting a message having first and second fields, in which the first field indicates whether the MNC is greater than a fixed length and whether the second field is included in the message.

U.S. Pat. No. 7,079,834 to Kyung et al. states that it describes a method for identifying a mobile device in a communication network by determining an identifier for the device. The identifier has one or more fields that include an MCC and an MNC.

Nevertheless, without help from a PLMN's broadcast channel messages, a UE having a SIM still cannot always know which digits of the IMSI belong to the MNC. Moreover, even if a HPLMN provides the necessary broadcast messages, the I-WLAN and GAN features allow improving indoor coverage such that it is increasingly likely that a UE does not have the possibility of receiving service from its HPLMN in the usual way. Thus, a UE having a SIM will not, in many cases, be able to determine whether a 2- or 3-digit MNC is used in its IMSI, and so such a UE will not be able to derive the identifiers/parameters needed for GAN and I-WLAN features as specified by 3GPP TS 23.003 and for enabling the UE to get network service.

SUMMARY

Three different solutions are described that enable a UE (using non-volatile memory) always to derive the required identifiers using the IMSI even when the UE has only a SIM. The first solution is based on a table, or list, that is maintained in the UE. The second solution is based on always taking the first six digits of the IMSI. The third solution is based on try-and-fail signaling. In consequence, the UE does not always need to know how many digits are used to indicate the MNC, which in some situations is impossible to know anyway.

In accordance with aspects of this invention, there is provided a UE for a communication system. The UE includes a SIM that includes an IMSI having a plurality of digits; and a processor configured to determine, from the IMSI, an MNC included in the IMSI whether the MNC is two digits or three digits. The processor is further configured to generate, based on the MNC, an identifier for a service available from the communication system.

In accordance with further aspects of this invention, there is provided a method in a UE for a communication system of determining a MNC included in an IMSI having a plurality of digits, the IMSI being stored in a SIM and the MNC being either two digits or three digits. The method includes the steps of retrieving the stored IMSI, and determining the MNC from the retrieved IMSI whether the MNC is two digits or three digits.

In accordance with further aspects of this invention, there is provided a computer-readable medium having stored instructions that cause the computer, when executing the stored instructions, to perform a method in a UE for a communication system of determining an MNC included in an IMSI having a plurality of digits. The IMSI is stored in a SIM and the MNC is either two digits or three digits. The method includes the steps of retrieving the stored IMSI, and determining the MNC from the retrieved IMSI whether the MNC is two digits or three digits.

BRIEF DESCRIPTION OF THE DRAWINGS

The various features, objects, and advantages of this invention will be apparent after reading this description together with the drawings, in which.

DETAILED DESCRIPTION

Figure 1:
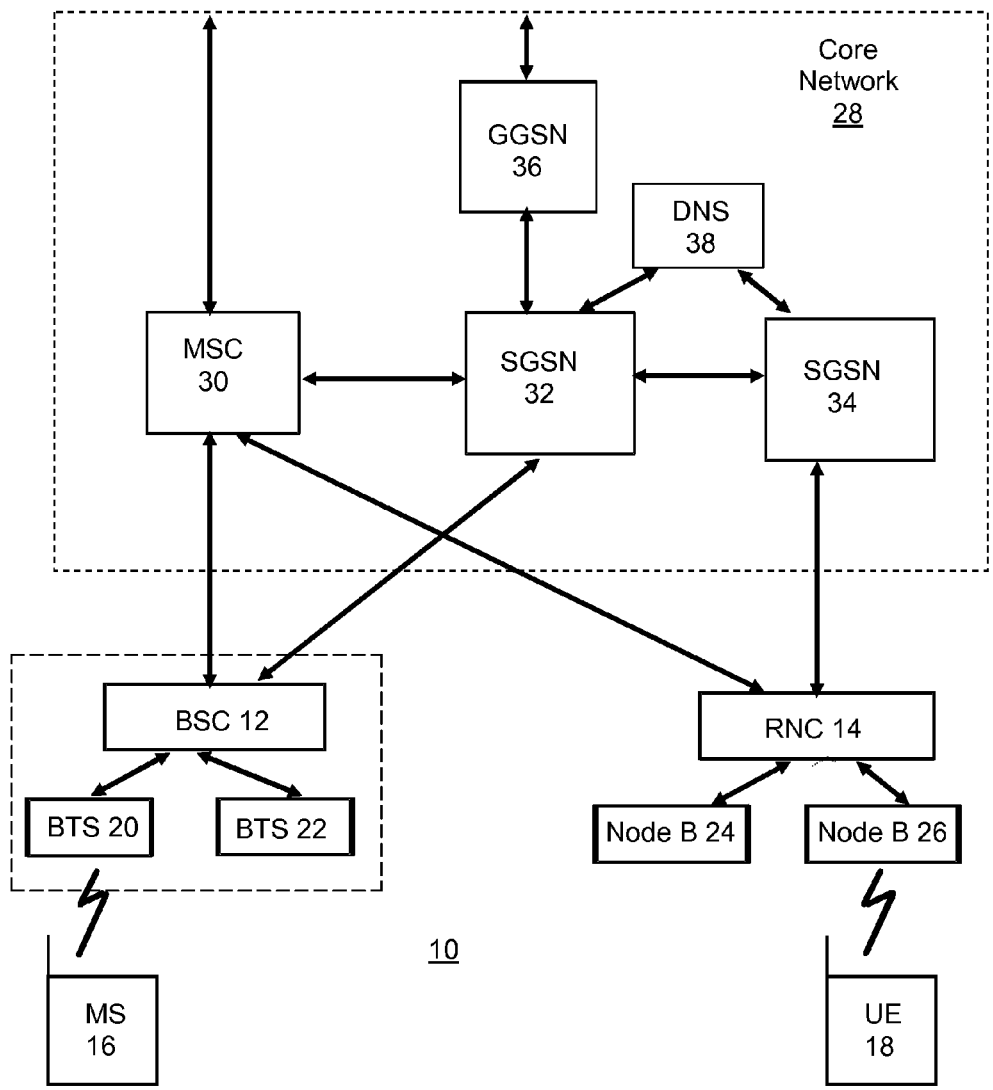
FIG. 1 depicts a communication system.
Figure 2:
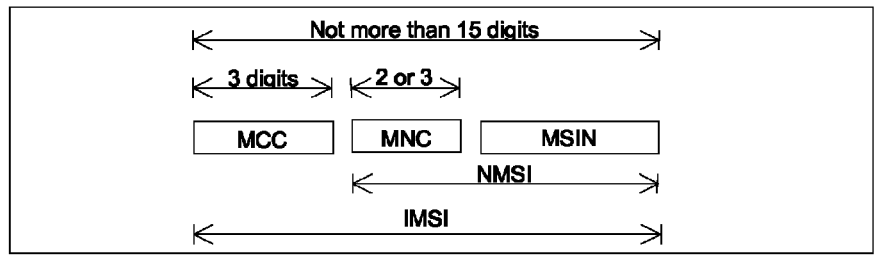
FIG. 2 depicts an international mobile subscriber identity.

The inventors have recognized that it is possible for a UE having a SIM always to determine which form of MNC (2-digit or 3-digit) is included in its IMSI when the UE cannot know a priori whether the MNC is two digits or three digits. In accordance with a first technique for determining the form of MNC, the UE accesses a table, or list, that contains information necessary for the UE always to be certain about whether a 2- or 3-digit MNC is used in its IMSI. For example, the table can be stored in the UE and contain all possible countries and corresponding networks, indicated by MCCs and corresponding MNCs. With such a table, a UE, or more precisely a processor in the UE, can determine its MNC by first determining the MCC from its IMSI, then finding the determined MCC in the stored table, and then reading the MNC corresponding to that MCC.

Of course, other configurations of the table are also possible. For example, the table may include only countries (MCCs) where 3-digit MNCs are used. If the UE finds its MCC in such a table, then the UE has determined that its MNC is a 3-digit MNC, which can be extracted from the IMSI. Not finding an MCC in such a table indicates that the corresponding MNC is a 2-digit MNC, which can then be correctly extracted from the IMSI. For another example, the table may include only countries (MCCs) where either 3-digit MNCs or combinations of 2- and 3-digit MNCs are used, with the corresponding MNCs stored in association with the corresponding MCCs. If the UE finds its MCC in such a table, then the UE can read its MNC. Not finding an MCC in such a table indicates that the corresponding MNC is a 2-digit MNC, which can then be correctly extracted from the IMSI.

It will be understood that such stored tables need to be kept up-to-date, which is important in order always to allow registration to 3GPP network operators by means of the GAN or I-WLAN features. New networks will continue to be built in new countries, and so new MCCs and MNCs will be continually introduced and the list set forth in ITU-T Recommendation E.212 will be continually updated. Additionally, it might be desirable for a network operator to have full control of the information contained in all UEs with regard to MCC and MNC because that information can change over time.

To avoid possibly different and unexpected behaviors of UEs depending on their implementations, it is currently believed desirable to standardize the stored tables and updating mechanism, which should be such that it reduces problems arising from a large time gap between the moment that a new MCC or MNC appears and the moment that the new MCC or MNC is introduced into the tables of UEs all over the world.

The inventors have recognized that such tables and update mechanism can be implemented by a suitable UE Management Object (MO) that contains the table and by use of Device Management (DM) servers in the PLMN. The DM server(s) create, update, and modify the stored information as necessary by using OMA DM protocol procedures. DM would preferably be implemented according to specifications promulgated by the Open Mobile Alliance (OMA) for communication devices. For example, versions 1.1.2 and 1.2 of those specifications define a protocol for managing configuration, data, and settings in communication devices. OMA standards and other information are available at http://www.openmobilealliance.org.

OMA DM can be used to manage the MOs of UEs from the points of view of different DM Authorities, including setting initial configuration information in UEs, subsequently updating persistent information in UEs, retrieving management information from UEs, and processing events and alarms generated by UEs. Using OMA DM, third parties can configure UEs on behalf of end users. A third party, such as a network operator, can remotely set UE parameters and install or upgrade software through suitable MOs in the UE. An MO is generally a software object that may be written, for example, according to SyncML, which is a mark-up language specification of an XML-based representation protocol, synchronization protocol, and DM protocol, transport bindings for the protocols, and a device description framework for DM.

Figure 3:
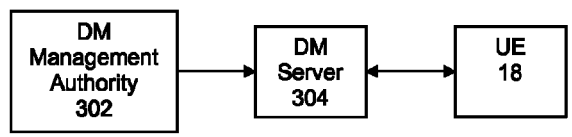
FIG. 3 depicts an arrangement for device management.

As depicted in FIG. 3, a DM Management Authority (MA) 302 issues a request to a DM Server 304, for example, to provision a table in one or more UEs. The DM Server 304 sends a Server-initiated Notification to a UE 18, which establishes a DM Session with the DM Server 304. The DM Server 304 sends DM commands to adjust the UE's configuration to conform to requirements established by the DM MA 302, e.g., an updated table. The UE 18 and DM Server 304 end their DM Session, and the UE is able to access network data services using the configured table.

Because it is currently recommended that new network operators (PLMNs) in new countries are assigned 3-digit MNCs, it is currently believed that the best implementation of the table described above is to store in the UE only a list of countries where 2-digit MNCs, or combinations of 2- and 3-digit MNCs, are used. For a country using combinations, it would be possible to store additional information that contains the MNCs in that particular country or at least the first digits of the MNCs in that particular country. Thus, the UE would check the table for the MCC derived from its IMSI. If the MCC is in the table, the UE can determine that in that country:

only 2-digit MNCs are used, and so the UE can derive the necessary GAN and I-WLAN identifier(s) using a 2-digit MNC; and 2-digit and 3-digit MNCs are used, and so the UE checks the first digit of the MNC in the IMSI to know whether it needs to derive the necessary identifiers using a 2- or 3-digit MNC. For all other countries (i.e., MCCs not in the table), the UE derives the necessary identifier(s) using a 3-digit MNC.

Using a table as described above, a UE having a SIM can always determine whether a 2- or 3-digit MNC is used. This solution can be future-proof in that new PLMNs will be assigned 3-digit or otherwise known-length MNCs. On the other hand, UEs will have to support new tables of MCCs and/or MNCs, and such support may impact their designs and implementations. As new countries/regions or networks (MCCs, MNCs) are introduced, table updates will be needed if such new networks are given 2-digit MNCs. Additional functionality in other nodes of a network may also be required if a network operator wishes to control the tables stored in the operator's UEs, and the operator's administrative cost to ensure that UEs always have the latest information needed for proper I-WLAN and GAN operation would increase.

Instead of relying on a table as described above, the inventors have recognized that a UE having a SIM can simply determine the necessary GAN and I-WLAN identifiers from the first 6 digits of the IMSI. The UE would then still use the 3-digit MCC and always use the next three digits as a 3-digit MNC. As a result, when the IMSI's MNC consists of only two digits, the first digit of the MSIN is used in the MNC, and the zero is not added to make a 3-digit MNC as explained above when deriving identifiers for the SIM case.

A consequence of this technique is that the DNS table used by the DNS server has to be extended for 2-digit MNCs in a way that considers all possible combinations with three digits. For example, suppose the IMSI is "234156969696969" and the MNC is "15". If the UE sends an address ".mnc156.", which is the first 6 digits of the IMSI, then the DNS server 38 should translate the address sent by the UE into the IP address assigned to ".mnc015.", which is the correct address that should have been sent by the UE. Because the MSIN can start with any digit in the range from 0 to 9, all ".mnc15x." addresses, in which "x" is in the range from 0 to 9, should translate to the same IP address.

If the UE is in its HPLMN, the DNS server 38 is in the HPLMN, but this is not necessary. To transport GPRS traffic between visited PLMNs (VPLMNs) and a HPLMN, network operators typically use an IP packet exchange (IPX) network for GPRS Roaming exchange (GRX). Such a GRX/IPX network has an architecture that contains a DNS server that is used for roaming between operators. The GRX/IPX network is described in GSM Association (GSMA) Permanent Reference Document (PRD) IR 34, Inter-Service Provider IP Backbone Guidelines, V4.2 (October 2007) and PRD IR 67, DNS Guidelines for Operators, V2.0.0 (Apr. 30, 2007). Moreover, it will be understood that FIG. 1 shows the DNS server 38 in a stand-alone configuration, but this is not necessary. For example, one or more of the SGSNs 32, 34 as well as other possible devices can each include a local caching DNS server.

A UE having a SIM that always assumes a 3-digit MNC would be advantageous in that the UE would not need to know whether a 2- or 3-digit MNC is used, and so the UE's derivation of GAN and I-WLAN identifiers would be simplified. In addition, GAN registration for all UE implementations can always be achieved, and this technique is clearly future-proof as new networks will have 3-digit MNCs and is backward-compatible. As new countries/regions or networks (MCCs, MNCs) are introduced, updates would be needed only in the DNS server, and such updates should be cheaper and faster than updates in the UEs.

On the other hand, current UE specifications would have to be modified with respect to the identifier derivation methods to permit a UE always to assume a 3-digit MNC. All combinations of 2-digits MNCs would have to be stored in the DNS server, but once stored, they would not be updated. This is a disadvantage because there may be need to add considerable configuration in the DNS server. For example, the DNS server might need to be provisioned with up to ten times as many domains, which would be a concern mainly for a GRX/IPX DNS server but could also affect each network operator's DNS server. A possible disadvantage of such provisioning would be the need to update already existing DNS deployments.

Instead of using a table to determine the MNC or always assuming a 3-digit MNC for those situations when a UE having a SIM does not know whether a 2- or 3-digit MNC is used, the inventors have also recognized that the UE can attempt to generate the necessary GAN, I-WLAN, and similar identifiers/parameters by "guessing" that either a 2- or 3-digit MNC is used. Such a UE would have a fifty-percent chance of success with its first "guess", or choice.

If the DNS server cannot resolve the provided identifier/parameter generated by the UE, the DNS server returns a suitable indication that informs the UE of the error. For example, a cause value "dns_unresolved_hostname" may be returned to the terminal. After receiving the indication from the DNS server, the UE generates another identifier/parameter, but this time after choosing the other number of digits for the MNC, and tries again. Thus, if the UE receives an error response to an identifier/parameter generated from a first-choice 2-digit MNC, the UE generates the identifier/parameter from a second-choice 3-digit MNC, or vice versa. At most two attempts would be necessary to achieve correct generation of identifiers/parameters, guaranteeing that the UE will get a correct IP address from the DNS server.

A UE having a SIM that simply "guesses" the length of the MNC would be advantageous in that the UE would not need to know whether a 2- or 3-digit MNC is used. GAN registration for all UE implementations would always be achieved with at most two attempts, and this technique is clearly future-proof as new networks will have 3-digit MNCs and is backward-compatible. As new countries/regions or networks (MCCs, MNCs) are introduced, updates would be needed only in the DNS server, and such updates should be cheaper and faster than updates in the UEs, although implementation in a UE should be cheap and fast. No updates in the DNS server would be needed for 2-digit MNCs. On the other hand, current UE specifications would have to be modified to describe such "guessing", impacting the design and implementation of UEs. If the UE does not succeed with its first guess, the UE is forced to try again, which results in a short time delay as well as more signaling messaging and unwanted DNS traffic.

This application describes three solutions to the problem of unknown length of an IMSI MNC. All solutions enjoy the following characteristics:

the requirements of use of SIM for the I-WLAN and GAN features are fulfilled;

impacts on current procedures are avoided or minimized;

impacts on UEs and networks are minimized, and time-to-market is generally short; and the solutions are future-proof as new MCCs and MNCs are added in the future.

Figure 4:
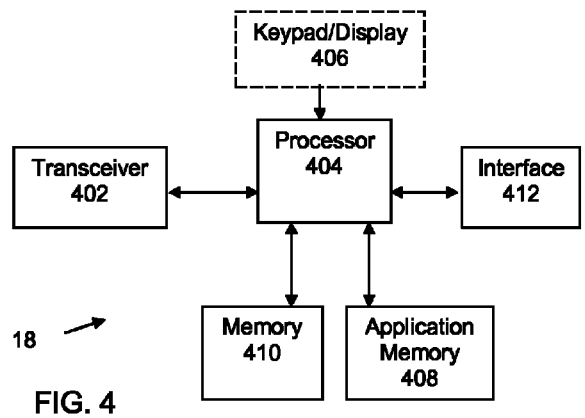
FIG. 4 is a block diagram of a user equipment for a communication system.

FIG. 4 is a block diagram of a typical UE 18, including a transceiver 402 that is suitable for exchanging radio signals with BTSs/Node Bs in a network (not shown in FIG. 4). Information carried by those signals is handled by a processor 404, which may include one or more sub-processors, and which executes one or more software modules and applications to carry out the identifier/parameter determinations described in this application. User input to the UE 18 may be provided through an optional keypad or other device, and information may be presented to the user on an optional display 406. The keypad/display 406 is considered optional, and is thus indicated by dashed lines, because some devices, such as embedded mobile devices and machine-to-machine communication modules, may not need a keypad or a display. Software applications may be stored in a suitable application memory 408, and the device may also download and/or cache desired information in a suitable memory 410. The UE 18 also may include an interface 412 that can be used to connect other components, such as a computer, keyboard, etc., to the UE 18.

Figure 5:
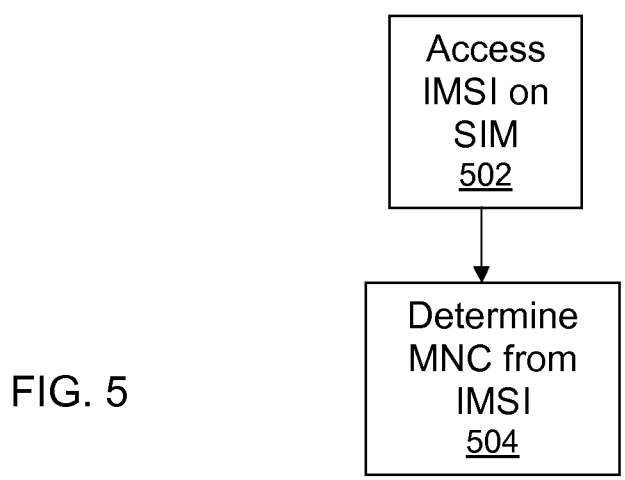
FIG. 5 is a flow chart of a method of determining a mobile network code.

By suitably configuring the UE 18, e.g., by suitably programming the processor 404, the UE can carry out methods of determining an MNC included in an IMSI stored in the UE's SIM. FIG. 5 is a flow chart of such a method. In step 502, the stored IMSI is retrieved, and in step 504, the MNC is determined from the retrieved IMSI. As described above, step 504 can be carried in several ways.

For example, determining the MNC can include determining an MCC from the retrieved IMSI, searching for the determined MCC in a table of information necessary for the UE always to ascertain whether the MNC included in the retrieved IMSI has two digits or three digits, and determining the MNC based on the searching. The table of information can include information identifying countries and corresponding networks by MCCs and corresponding MNCs, and the determining step then includes finding the determined MCC in the table and then reading the MNC corresponding to the determined MCC. The table can include information identifying only countries having MNCs of a predetermined length, the countries being identified by MCCs, and the MNC is then determined based on whether the determined MCC is found in the table. The table may also be updated by executing a device management object.

For yet another example, the determining step can include selecting three digits in three predetermined positions of the IMSI. The determining step can also include choosing a first group of digits of the IMSI as the MNC, sending a message based on the first group of digits, and choosing a second group of digits as the MNC in response to an error indication.

It will be appreciated that procedures described above are carried out repetitively as necessary, for example, to respond to the time-varying nature of communication channels between transmitters and receivers. To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A user equipment for a communication system, comprising:
    a subscriber identity module that includes an international mobile subscriber number (IMSI) having a plurality of digits; and
    a processor configured to determine, from only the IMSI, a mobile network code (MNC) included in the IMSI, including a length of the MNC, when the user equipment cannot know a priori whether the MNC is two digits or three digits, and the processor is further configured to generate, based on the MNC, an identifier for a service available from the communication system;
    wherein either the processor is configured to determine the MNC by choosing a first group of digits of the IMSI, and in response to an error indication, by choosing a second group of digits; or the user equipment further comprises a memory having a stored table of information and the processor is configured to determine a mobile country code (MCC) from the IMSI and to determine the MNC from the table based on the determined MCC.

2. The user equipment of claim 1, wherein the stored table of information includes information identifying countries and corresponding networks by MCCs and corresponding MNCs, and the processor is further configured to determine the MNC by finding the determined MCC in the stored table and then reading the MNC corresponding to the determined MCC.

3. The user equipment of claim 1, wherein the stored table of information includes information identifying only countries having MNCs of a predetermined length, the countries being identified by MCCs, and the processor is further configured to determine the MNC by searching for the determined MCC in the stored table, and based on whether the determined MCC is found in the stored table, to extract the MNC from the IMSI.

4. The user equipment of claim 1, further comprising a device management object which, when executed by the processor, updates the stored table of information.

5. A method in a user equipment (UE) for a communication system of determining a mobile network code (MNC) included in an international mobile subscriber number (IMSI) and the MNC being either two digits or three digits, the method comprising the steps of:
    retrieving, by the UE, an IMSI having a plurality of digits and stored in a subscriber identity module; and
    determining, by the UE, the MNC including a length of the MNC from only the retrieved IMSI, when the UE cannot know a priori whether the MNC is two digits or three digits;
    wherein determining the MNC includes either
        choosing a first group of digits of the IMSI as the MNC, sending a message based on the first group of digits, and choosing a second group of digits as the MNC in response to an error indication; or
        determining a mobile country code (MCC) from the retrieved IMSI, searching for the determined MCC in a table of information necessary for the user equipment always to ascertain whether the MNC included in the retrieved IMSI has two digits or three digits, and determining the MNC based on the searching; and
    generating, based on the MNC, an identifier for a service available from the communication system.

6. The method of claim 5, wherein the table of information includes information identifying countries and corresponding networks by MCCs and corresponding MNCs, and the determining step includes finding the determined MCC in the table and then reading the MNC corresponding to the determined MCC.

7. The method of claim 5, wherein the table includes information identifying only countries having MNCs of a predetermined length, the countries being identified by MCCs, and the MNC is determined based on whether the determined MCC is found in the table.

8. The method of claim 5, wherein the determining step further comprises the step of updating the table by executing a device management object.

9. A non-transitory computer-readable medium having stored instructions that cause the computer, when executing the stored instructions, to perform a method in a user equipment for a communication system of determining a mobile network code (MNC) included in an international mobile subscriber number (IMSI) and the MNC being either two digits or three digits, the method comprising the steps of:
    retrieving an IMSI having a plurality of digits and stored in a subscriber identity module; and
    determining the MNC including a length of the MNC from only the retrieved IMSI, when the user equipment cannot know a priori whether the MNC is two digits or three digits;
    wherein determining the MNC includes either
        choosing a first group of digits of the IMSI as the MNC, sending a message based on the first group of digits, and choosing a second group of digits as the MNC in response to an error indication; or determining a mobile country code (MCC) from the retrieved IMSI, searching for the determined MCC in a table of information necessary for the user equipment always to ascertain whether the MNC included in the retrieved IMSI has two digits or three digits, and determining the MNC based on the searching; and generating, based on the MNC, an identifier for a service available from the communication system.

10. The medium of claim 9, wherein the table of information includes information identifying countries and corresponding networks by MCCs and corresponding MNCs, and the determining step includes finding the determined MCC in the table and then reading the MNC corresponding to the determined MCC.

11. The medium of claim 9, wherein the table includes information identifying only countries having MNCs of a predetermined length, the countries being identified by MCCs, and the MNC is determined based on whether the determined MCC is found in the table.

12. The medium of claim 9, wherein the determining step further comprises the step of updating the table by executing a device management object.

\* \* \* \* \*

UNITED STATES PATENT AND TRADEMARK OFFICE
CERTIFICATE OF CORRECTION

| | | |
|---|---|---|
| PATENT NO. | : 8,619,665 B2 | Page 1 of 1 |
| APPLICATION NO. | : 11/963802 | |
| DATED | : December 31, 2013 | |
| INVENTOR(S) | : Hedberg et al. | |

It is certified that error appears in the above-identified patent and that said Letters Patent is hereby corrected as shown below:

In the Specification

In Column 9, Lines 9-10, after "store," delete "communicate, propagate,".

In Column 9, Lines 14-15, delete "apparatus, device, or propagation medium." and insert -- apparatus, or device. --, therefor.

Signed and Sealed this
Fifth Day of August, 2014

Michelle K. Lee
*Deputy Director of the United States Patent and Trademark Office*